United States Patent [19]

Varga et al.

[11] Patent Number: 5,019,958
[45] Date of Patent: May 28, 1991

[54] GENERALIZED SYNTHESIS OF CONTROL SYSTEMS OF ZERO-ORDER/INSTANTANEOUS RESPONSE AND INFINITE DISTURBANCE REJECTION RATIO

[76] Inventors: Ljubomir D. Varga, Deskaseva 6, 11000, Beograd, Yugoslavia; Novica A. Losic, 7802-23 Ave., Kenosha, Wis. 53140

[21] Appl. No.: 479,275

[22] Filed: Feb. 12, 1990

[51] Int. Cl.$^5$ .............................. H02P 5/00; H02P 7/00
[52] U.S. Cl. ........................................ 363/97; 323/285; 318/615; 318/798; 388/809
[58] Field of Search .............................. 363/21, 41, 97; 323/285-287; 318/615, 616, 617, 618, 798, 799; 388/809, 810, 811, 812, 813, 814, 815, 844, 845, 847

[56] References Cited

U.S. PATENT DOCUMENTS

| | | | |
|---|---|---|---|
| 4,885,674 | 12/1989 | Varga et al. | 363/21 |
| 4,967,134 | 10/1990 | Losic et al. | 318/802 |
| 4,990,001 | 2/1991 | Losic et al. | 388/811 |

Primary Examiner—Peter S. Wong

[57] ABSTRACT

A generalized method of synthesizing control systems of instanteous response and zero error in both transient and steady state with respect to input commands and of infinite disturbance rejection ratio with respect to external distrubances, carried out in the state-space vector-matrix form for generality obviousness and applicability, comprising terms in a form of local positive feedback state variable differentiators for cancelling the derivative terms in each of the n first order differential equations describing an n-th order system in the state-space representation and thus yielding a zero-order system with the instantaneous response to the input command column vector, and further comprising terms in form of local controller positive feedback control loops for cancellation of a system matrix and thus providing a load/disturbance-invariant system with associated infinite disturbance rejection ratio. All local positive feedback loops are closed within a negative feedback control loops to ensure stability. The generalized synthesis method is applied in synthesizing electric motor drive systems, including dc, synchronous and asynchronous ac, and step motor drive systems, of zero-order dynamics/instantaneous response and infinite distrubance rejection ratio with respect to a load torque changes while operating in an open-loop mode with respect to the variables under the control.

10 Claims, 4 Drawing Sheets

GENERALIZED SYNTHESIS OF CONTROL SYSTEMS OF ZERO-ORDER/INSTANTANEOUS RESPONSE AND INFINITE DISTURBANCE REJECTION RATIO

FIELD OF THE INVENTION

This invention relates to systems and controls using a local positive feedback state variable differentiators and a local positive feedback control loops incorporating elements of a system matrix, all local positive feedback loops being within a negative feedback control loops, to control the output column vector when either the input command column vector or the external disturbance column vector changes by making the system of zero-order/instantaneous response and infinite disturbance rejection ratio.

BACKGROUND OF THE INVENTION

In the systems and controls theory as well as in the practice it is of interest to follow input commands as closely as possible and to minimize effects of external (load) disturbances, in both transient and steady state. Further it is of ultimate interest to develop a generalized algorithm for the synthesis of control systems of zero-order/instantaneous response and infinite disturbance rejection ratio.

Theoretically, both zero-order and infinite disturbance rejection ratio may be achieved using a negative feedback control theory and employing an infinite gain, topologically located in a loop before the point of entry of disturbance, but, in such a case, the system will necessarily become unstable, so that, with this classical approach, no solution can be reached. This remains a classical problem in system and control theory and practice.

In modern control theory the problem basically remains the same. See, for example, the attempts and the results as well as the discussions in G. H. Hostetter et al, "Design of Feedback Control Systems", Holt, Rinehart and Winston, 1982, Section 7.9 (A Magnetic Levitation System), pp. 423–430, B. C. Kuo, "Automatic Control Systems", Prentice-Hall Inc., 4th Ed., 1982, Section 8.8 (State Feedback With Integral Control), pp. 529–536, W. A. Wolovich, "Robotics: Basic Analysis and Design", Holt, Rinehart and Winston 1987, Chapter 8, and in particular Section 8.4 (Inverse Dynamic Feedforward Control) and Section 8.5 (Nonlinear and Two-Part Control), pp. 311–345, and C. L. Phillips and R. D. Harbor, "Feedback Control Systems", Prentice-Hall Inc., 1988, Chapter 13 (Modern Control Design), and especially Section 13.1 (Pole-Placement Design) and Example 13.2 with the concluding remarks, pp. 509≧518.

We will cite at this point a portion from the concluding remarks above (pp. 518): "It appears from the preceding example that we can choose the magnitude of the real part of the roots arbitrarily large, making the system response arbitrarily fast. For the system model, we can do this. However, as the time constant of the system becomes smaller, the gains increase." This conclusion coincides with the problem stated in connection with the classical control theory and practice.

An infinite disturbance rejection ratio, i.e., load independence, has been achieved employing a positive feedback as described in the U.S. Pat. No. 4,885,674 "Synthesis of Load-Independent Switch-Mode Power Converters" by these same two inventors Lj. Dj. Varga and N. A. Losic, and in the patent application No. 07/323,630, November 1988, "Synthesis of Load-Independent DC Drive System" by N. A. Losic and Lj. Dj. Varga, and patent application No. 07/316,664, February 1989, "Synthesis of Load-Independent AC Drive Systems" (allowed for issuance December 1989) by N. A. Losic and Lj. Dj. Varga, now U.S. Pat. No. 4,967,134. The inventions have been generalized with respect to providing infinite disturbance rejection ratio for both switch-mode power converters and electric motor drive systems, including step-motor drive systems, in a copending and coassigned application No. 07/452,000, December 1989, "Synthesis of Zero-Impedance Converter" by Lj. Dj. Varga and N. A. Losic.

Furthermore, a synthesis of electric motor drive systems of infinite disturbance rejection ratio and zero-order dynamics/instantaneous response is described in a copending and coassigned applications by N. A. Losic and Lj. Dj. Varga, "Synthesis of Improved Zero-Impedance Converter", December 1989, and "Synthesis of Drive Systems of Infinite Disturbance Rejection Ratio and Zero-Dynamics/Instantaneous Response", January 1990, in cases of not closing and closing additional velocity and position feedback loops, respectively.

SUMMARY OF THE INVENTION

It is therefore an object of the present invention to provide a generalized synthesis method to produce zero-order dynamics/instantaneous response and infinite disturbance rejection ratio in control systems.

Briefly, for application to any control system, the preferred embodiment of the present invention includes a local positive feedback state variable differentiators to cancel the derivative terms in each of the n first order differential equations describing an n-th order system in the state-space representation and therefore providing a zero-order system with the instantaneous response to the input column vector, and further includes a local controller positive feedback loops, incorporating elements of a system matrix, to cancel the system matrix and thus providing an infinite disturbance rejection ratio, all local positive feedback loops being within a negative feedback control loops to ensure system stability.

Besides providing a general unified approach to the synthesis of control systems of n-th order of zero-order/instantaneous response and infinite disturbance rejection ratio, other advantages of the present invention include the provision of such a method which provides constant output-column-vector-change-to-input-command/reference-column-vector-change characteristics, relating the two vectors through a linear algebraic operation; and the provision of such a method which provides zero output-column-vector-change-to-external-disturbance-column-vector-change characteristics, the linear algebraic operation relating the input and the output vector being free of elements of a system matrix.

Yet another advantage of the present invention is in showing a possibility in using a feedforward algorithms to achieve the zero-order/instantaneous response and infinite disturbance rejection ratio, in addition to sensing/estimating some of the system state variables instead of all of them. This possibility is explored and used in an application of the generalized synthesis method to synthesizing electric motor drive systems, including dc, synchronous and asynchronous ac, and step motor drive systems, of zero-order dynamics/instantaneous response and infinite disturbance rejection ratio with respect to a load torque changes while operating in an open-loop mode with respect to the variables under the control.

Also, a differentiation-free algorithm, whereby n local positive feedback state variable differentiators are replaced by direct sensing/estimating state variable derivatives and feeding them back in a positive feedback manner, is shown to be of advantage.

These and other objects and advantages of the present invention will no doubt be obvious to those skilled in the art after having read the following detailed description of the preferred embodiments which are illustrated in the FIGURES of the drawing.

DETAILED DESCRIPTION

This application represents a generalization of the previous patents and patent applications on behalf of these two same inventors, as listed in the background of the invention. The generalization is effected through the use of a state-space vector-matrix format in the system synthesis.

The purpose of the state variable model, or state space model, as it is well known, is to develop a representation which preserves the input-output relationship (that of the transfer function), but which is expressed in n first-order coupled differential equations, written in vector-matrix format, for an n-th order system. The advantage of the n first-order equations is that, in addition to the input-output characteristics, presentable as well by the transfer function, the internal characteristics of the system are represented, too.

The standard form of the state equations of a linear system is given by $$\left.\begin{array}{l}\dot{\hat{x}}(t) = \hat{A}\hat{x}(t) + \hat{B}\hat{u}(t) \\ \hat{y}(t) = \hat{C}\hat{x}(t) + \hat{D}\hat{u}(t)\end{array}\right\} \quad (1)$$

where
$\hat{x}(t)$ = state vector = $(n \times 1)$ vector of the states of an n-th order system,
$\hat{A} = (n \times n)$ system matrix,
$\hat{B} = (n \times r)$ input matrix,
$\hat{u}(t) = (r \times 1)$ input (column) vector,
$\hat{y}(t) = (p \times 1)$ output (column) vector,
$\hat{C} = (p \times n)$ output matrix, and
$\hat{D} = (p \times r)$ matrix representing direct coupling between input and output.

Usually the matrix $\hat{D}$ is zero, since in physical systems dynamics appear in all paths between the inputs and the outputs. A nonzero value of $\hat{D}$ indicates at least one direct path between the inputs and the outputs in which path transfer function can be modeled as a pure dc gain.

The latter argument indicates the way for synthesizing zero-dynamics/instantaneous response system: such a system is synthesizeable by cancelling the state variable derivatives $\dot{\hat{x}}(t)$ so that the state vector $\hat{x}(t)$ of Eq.(1) can be expressed through a linear algebraic operation and, by substituting in the equation for the output vector $\hat{y}(t)$, the output vector $\hat{y}(t)$ and the input vector $\hat{u}(t)$ are related to each other through direct paths of zero dynamics implying instantaneous response Alternatively, the cancellation of the derivatives of the state variables is equivalent to eliminating all nonzero powers of the Laplace complex variable s in the system function description adopted due to the use of the Laplace transform, resulting in the zero-order system.

Figure 1A:
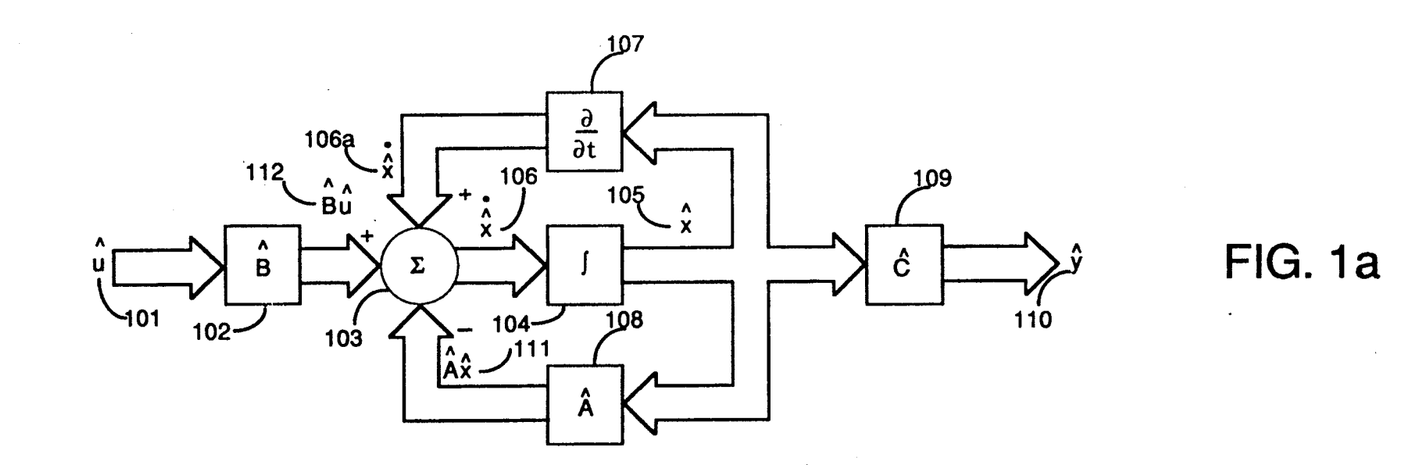
FIG. 1 is a block diagram in a state variable form of a zero-order/instantaneous response system.

FIG. 1a shows the synthesis of the zero-order dynamics/instantaneous response system applied to the n-th order system. In actuality, this means that synthesis procedure is repeated n times by closing n local positive state differentiating feedback loops to cancel the n state variable derivatives in the n state variable equations. In FIG. 1a, an input column vector $\hat{u}(t)$ denoted by numeral 101 is applied via an input matrix $\hat{B}$, denoted by numeral 102, to a matrix algebraic summer 103. The $\hat{A}$ matrix in FIG. 1a, denoted by numeral 108, is called a system control matrix as it represents the addition of the conventional negative feedback control matrix to the system open-loop/inherent matrix. The system control matrix $\hat{A}$, denoted with numeral 108, feeds in a negative feedback manner the states of the system, represented by a state vector $\hat{x}(t)$ numbered 105, by providing a system control matrix vector product $\hat{A}\hat{x}(t)$ numbered 111 to the matrix algebraic summer 103 in a negative feedback with respect to an input matrix vector product $\hat{B}\hat{u}(t)$ numbered 112. (It should be noted at this point that a time dependency of state variables and their derivatives is implicitly assumed in all FIGURES of the drawing and it is not explicitly shown by a functionality (t)). The state vector $\hat{x}(t)$ is obtained by integrating n state variable derivatives $\dot{\hat{x}}(t)$, referred to by numeral 106, in integrators 104. An output column vector $\hat{y}(t)$, referred to by numeral 110, is obtained from the state vector via an output matrix $\hat{C}$, denoted with numeral 109. The synthesis procedure described in the beginning of this paragraph consists of sensing or estimating all n state comprising the state vector $\hat{x}(t)$ and feeding them back through n differentiators $\partial/\partial t$, referred to by numeral 107, to close a positive feedback loops in the matrix algebraic summer 103 with respect to the input matrix vector product 112, thus supplying n state variable feedback derivatives $\dot{\hat{x}}(t)$, denoted with numeral 106a, to cancel the n state variable derivatives $\dot{\hat{x}}(t)$, referred to by numeral 106 as shown next.

From FIG. 1a $$\dot{\hat{x}}(t) = -\hat{A}\hat{x}(t) + \hat{B}\hat{u}(t) + \dot{\hat{x}}(t) \quad (2)$$

From Eq.(2) and FIG. 1a $$\left.\begin{array}{l}\hat{x}(t) = \hat{A}^{-1}\hat{B}\hat{u}(t) \\ \hat{y}(t) = \hat{C}\hat{A}^{-1}\hat{B}\hat{u}(t)\end{array}\right\} \quad (3)$$

Eq.(3) represents the state-equation description of the zero-order/instantaneous response linear control system to which an original n-th order system has been reduced through the synthesis method illustrated in FIG. 1a. It is seen from Eq.(3) that the input-output relationship fixes the two vectors by a linear algebraic operation rather than by a differentiation operation, transforming the whole system into the ideal one from the point of response to the inputs. It should be mentioned that, for reducing this generalization to the synthesis of specific zero-order systems, the control algorithm may incorporate a feedforward algorithms, and this is incorporated in the generality of Eqs.(2,3) in that the input-output relationship is dependent on the matrices $\hat{A}$ and $\hat{B}$ from which dependency the required feedforward algorithms will follow. For example and as it will be shown later in applying the generalized algorithms developed here to electric motor drive systems in FIG. 4, to achieve zero-order dynamics in an electric motor drive system not all state variables have to be sensed/estimated if a feedforward algorithms are implemented in addition to sensing only one state variable: motor current. The sensed motor current is, according to FIG. 1a, differentiated and fed back in a positive feedback manner and, in this application of the generalized algorithm of FIG. 1a, the differentiated current is the only state variable feedback derivative obtained and used. The synthesis of the electric motor drive system for zero-order dynamics is then completed by an appropriate synthesis of a feedforward algorithms as discussed. While the synthesis method illustrated in FIG. 1a and described by the state equation of Eq.(2) does provide for the zero-order/instantaneous response of an original n-th order system, it does not provide for a system of infinite disturbance rejection ratio, i.e., load independence. The latter property is obtained by realizing that the disturbances effects are a direct function of the system matrix $\hat{A}$ so that a cancellation of this matrix will create a system of infinite disturbance rejection ratio. Similarly as before in connection with FIG. 1a, the cancellation of the system matrix $\hat{A}$ is achieved by a local positive feedback control loops closed through a replica of the system matrix $\hat{A}$, i.e., incorporating all elements of the system matrix $\hat{A}$.

Figure 1B:
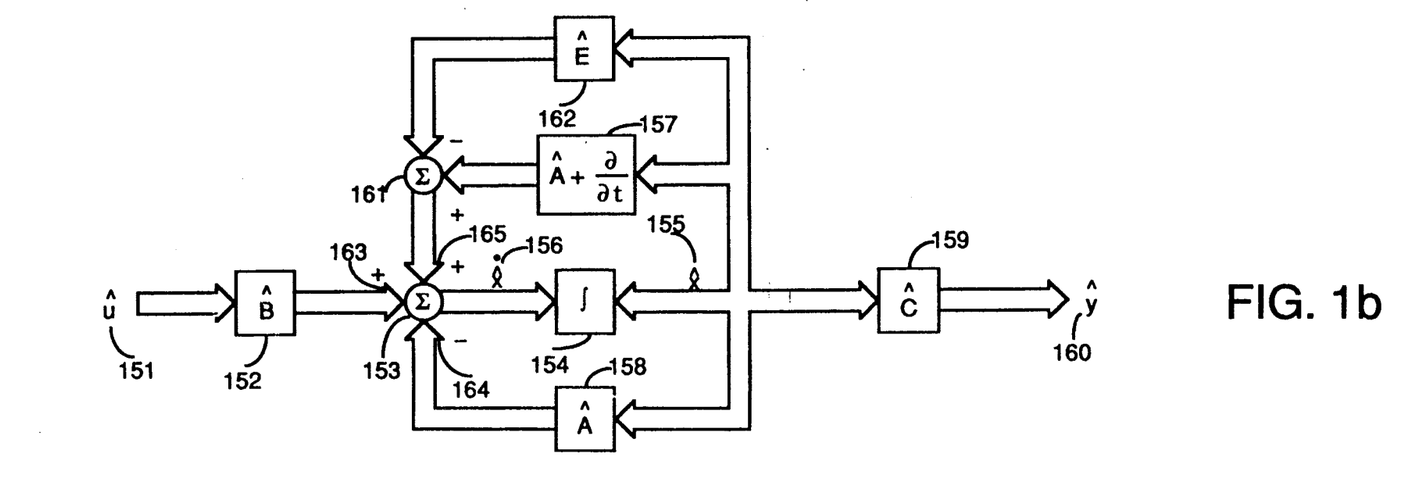
FIG. 1b is a block diagram in a state variable form of a system of zero-order/instantaneous response and infinite disturbance rejection ratio.

FIG. 1b shows the synthesis of the system of zero-order dynamics/instantaneous response and infinite disturbance rejection ratio according to the preceding discussion. In FIG. 1b, a control matrix $\hat{E}$, referred to by numeral 162, represent a desired control operation. The positive state feedback loops, containing elements of the system matrix $\hat{A}$ added to the differentiation operator $\partial/\partial t$ for each element of the state vector x(t), denoted by numeral 155, are controlled, i.e., the system stability is ensured, by the negative state feedback loops closed through the elements of the control matrix $\hat{E}$. In FIG. 1b, an input column vector $\hat{u}(t)$ denoted by numeral 151 is applied via an input matrix $\hat{B}$, denoted by numeral 152, to a matrix algebraic summer 153. In general case, a conventional negative feedback control matrix is added to the open-loop/inherent system matrix and the resulting system matrix $\hat{A}$, referred to by numeral 158, feeds in a negative feedback manner the states of the system represented by a state vector $\hat{x}(t)$ numbered 155, by providing a resulting system matrix vector product $\hat{A}\hat{x}(t)$ at point 164 to the matrix algebraic summer 153 in a negative feedback with respect to an input matrix vector product $\hat{B}\hat{u}(t)$ available at point 163. (It should be understood that, due to the algebraic nature of summing associated with all summers in FIGS. 1a, 1b, 2, and 3, the terms "negative" and "positive" feedback should be interpreted in that strict sense of the word for each element being summed with another corresponding element. In other words if each element of the resulting system matrix $\hat{A}$, denoted with number 158 in FIG. 1b, is positive, thus preserving the negative feedback closed at point 164 in the matrix algebraic summer 153, then each element of the resulting system matrix $\hat{A}$ incorporated in a system matrix and differentiation feedback operator 15 is also positive, thus preserving the positive feedback closed at point 165 in the matrix algebraic summer 153. For any negative element within the resulting system matrix $\hat{A}$ a corresponding positive feedback would occur at point 164 and a negative feedback would occur at point 165, in connection with the particular negative element of $\hat{A}$. What is of importance here is that, in any of the cases, the opposite sign feedbacks would result into a cancellation of the elements of the matrix of interest, in this case of the resulting system matrix $\hat{A}$. In the like manner, the feedback closed at point 165 in FIG. 1b, or at point 106a in FIG. 1a, always cancels state variable derivatives $\dot{\hat{x}}(t)$ numbered 156 in FIG. 1b or 106 in FIG. 1a). To continue description of FIG. 1b, we further see that the state vector $\hat{x}(t)$ is obtained by integrating n state variable derivatives $\dot{\hat{x}}(t)$, referred to by numeral 156, in integrators 154. An output column vector $\hat{y}(t)$, referred to by numeral 160, is obtained from the state vector $\hat{x}(t)$ via an output matrix $\hat{C}$, denoted with numeral 159. The synthesis procedure described in the previous paragraph consists of sensing or estimating all n states comprising the state vector and feeding them back through the system matrix and differentiation feedback operator 157 whose transfer characteristics are described by $[\hat{A}+\partial/\partial t]$ and closing a positive feedback loops in the matrix algebraic summer 153, via a feedback algebraic summer 161, with respect to the input matrix vector product supplied to point 163, while with respect to feedback loops closed at point 164 the feedback loops closed at point 165, in the matrix algebraic summer 153, are of opposite sign for each element of the resulting system matrix $\hat{A}$ Thus, n state variable feedback derivatives $\dot{\hat{x}}(t)$ plus n elements of a resulting system matrix vector product feedback $\hat{A}\hat{x}(t)$ are available as a feedback matrix and state derivatives $[\hat{A}\hat{x}(t)+\dot{\hat{X}}(t)]$ at point 165 together with a control matrix processed state variables $-\hat{E}\hat{x}(t)$. The control matrix processed state variables are obtained at the output of the control matrix $\hat{E}$ and are fed in a negative feedback manner to the matrix algebraic summer 153, via the feedback algebraic summer 161, with respect to the input matrix vector product $\hat{B}\hat{u}(t)$ supplied to point 163.

From FIG. 1b $$\dot{\hat{x}}(t) = \hat{A}\hat{x}(t) + \hat{B}\hat{u}(t) + \dot{\hat{x}}(t) + \hat{A}\hat{x}(t) - \hat{E}\hat{x}(t) \tag{4}$$

From Eq.(4) and FIG. 1b $$\left. \begin{array}{l} \hat{x}(t) = \hat{E}^{-1}\hat{B}\hat{u}(t) \\ \hat{y}(t) = \hat{C}\hat{E}^{-1}\hat{B}\hat{u}(t) \end{array} \right\} \tag{5}$$

Eq.(5) represents the state-equation description of the zero-order/instantaneous response and infinite disturbance rejection ratio linear control system to which an original n-th order system has been reduced through the synthesis method illustrated in FIG. 1b. It is seen from Eq.(5) that the input-output relationship fixes the two vectors by a linear algebraic operation rather than by a differentiation operation, transforming the whole system into the ideal one from the point of response to the inputs, and also the input-output relationship is free from the elements of the system matrix $\hat{A}$, which contain the effects of disturbances, making the system load independent with the associated infinite disturbance rejection ratio. Again, as in connection with Eq.(2), a particular application of the algorithm of Eq.(4) to achieve zero-order dynamics and infinite disturbance rejection ratio in electric motor drive systems, as it will be shown with reference to FIG. 4, may be reduced to incorporating only some of the elements of the system matrix $\hat{A}$ in the positive feedback loop achieving the infinite disturbance rejection ratio. This possibility is due to the presence of the control matrix $\hat{E}$ in Eqs.(4) and (5) which indicate that, for a particular choice of the elements of the control matrix $\hat{E}$, the remaining cancellation of the elements of the system matrix $\hat{A}$, in case when only some of them are cancelled through the positive feedback via the system matrix part of the operator 157, may be effected.

By partitioning the system of FIG. 1b into two separate entities: the controller and the process under the control, the algorithms presented so far may be made more specific. Thus, the dynamic linear control system described by the state space equation $$\dot{\hat{x}}(t) = \hat{A}\hat{x}(t) + \hat{B}\hat{u}(t) + \hat{d}(t) \tag{6}$$

where $\hat{d}(t)$ is a disturbance (column) vector, is partitioned into a controller and a process under the control as shown below $$\begin{bmatrix} \dot{\hat{x}}_1(t) \\ \dot{\hat{x}}_2(t) \end{bmatrix} = \begin{bmatrix} -\hat{A}_{11} & -\hat{A}_{12} \\ \hat{A}_{21} & \hat{A}_{22} \end{bmatrix} \begin{bmatrix} \hat{x}_1(t) \\ \hat{x}_2(t) \end{bmatrix} + \tag{7}$$

$$\begin{bmatrix} \hat{B}_{11} & 0 \\ 0 & 0 \end{bmatrix} \begin{bmatrix} \hat{u}_1(t) \\ 0 \end{bmatrix} + \begin{bmatrix} 0 \\ \hat{d}(t) \end{bmatrix}$$

which is rewritten as $$\dot{\hat{x}}_1(t) = -\hat{A}_{11}\hat{x}_1(t) - \hat{A}_{12}\hat{x}_2(t) + \hat{B}_{11}\hat{u}_1(t) \tag{8}$$

$$\dot{\hat{x}}_2(t) = \hat{A}_{21}\hat{x}_1(t) + \hat{A}_{22}\hat{x}_2(t) + \hat{d}(t) \tag{9}$$

Eq.(8) represents the controller state-space equation while Eq.(9) represents the process state-space equation. From these two equations it is seen that, as expected, the dynamic linear control system possesses dynamics other than zero and is load/disturbance dependent; i.e., the derivative terms and the disturbance (column) vector are present in the respective equations which provide for the output vector $\hat{x}_2(t)$.

The controller is now synthesized to cancel both the derivative terms and the elements of the controller system matrix $\hat{A}$ and thus to provide for the zero-order dynamics and infinite disturbance rejection ratio, as discussed in connection with FIG. 1b.

Figure 2:
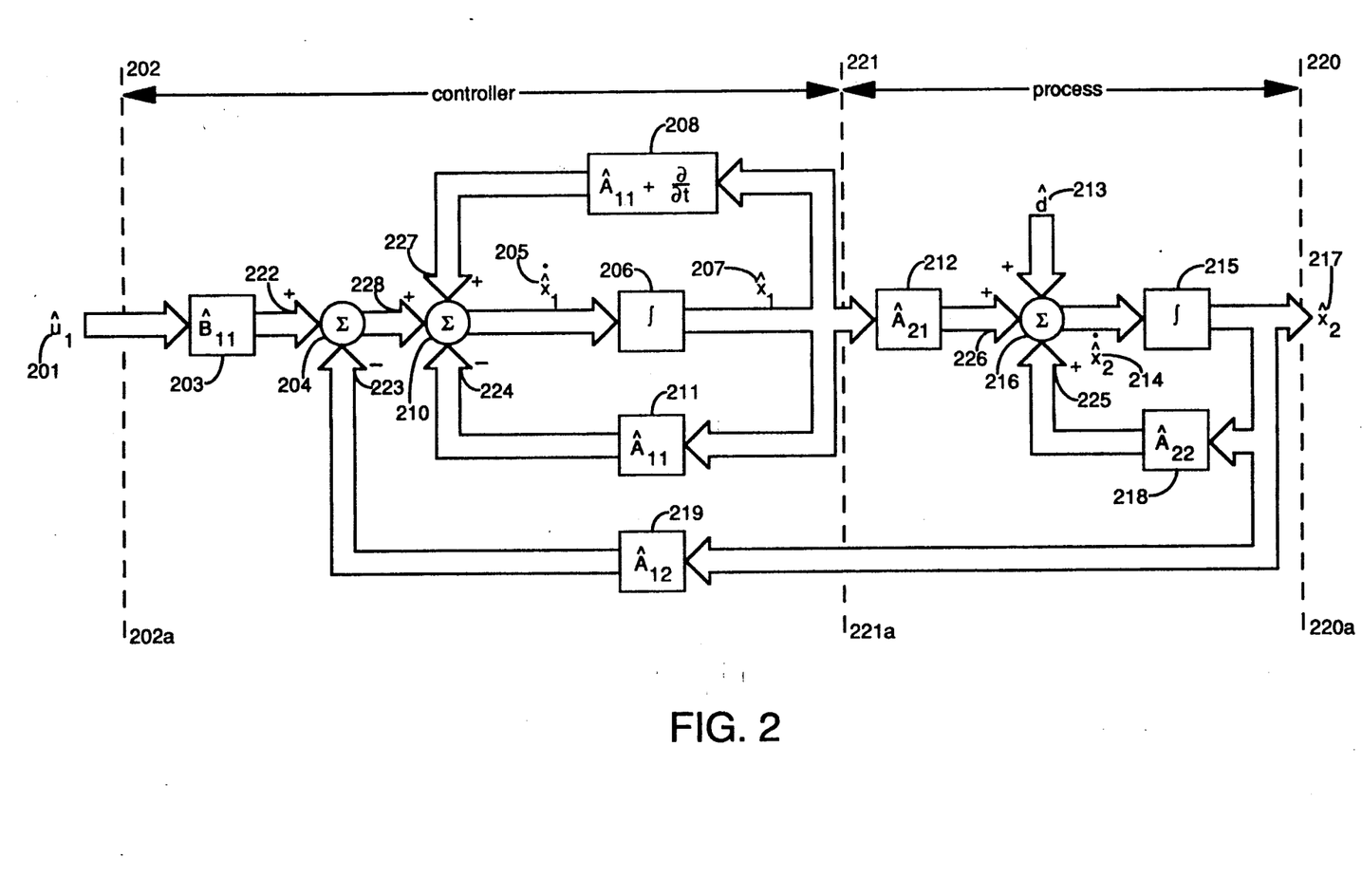
FIG. 2 is a block diagram in a state variable form of a first embodiment of the invention.

FIG. 2 shows the synthesis of a controller to provide for the zero-order dynamics and infinite disturbance rejection ratio for the process under the control. In FIG. 2, a control matrix $\hat{A}_{12}$, referred to by numeral 219, represents a desired control operation. The positive controller state feedback loops, containing elements of the controller system matrix $\hat{A}_{11}$ added to the differentiation operator $\partial/\partial t$ for each element of the controller state vector $\hat{x}_1(t)$, denoted by numeral 207, are controlled, i.e., the system stability is ensured, by the negative process state feedback loops closed through the elements of the control matrix $\hat{A}_{12}$. In FIG. 2, the controller portion is shown between boundaries 202-202a and 221-221a while the portion between boundaries 221-221a and 220-220a refers to the process under the control. In FIG. 2, an input column vector u (t) denoted by numeral 201 is applied via a controller input matrix $\hat{B}_{11}$, denoted by numeral 203, to a controller matrix algebraic summer 204. In general case, a conventional negative feedback local control matrix is added to the open-loop/inherent controller system matrix and the resulting controller system matrix $\hat{A}_{11}$, referred to by numeral 211, feeds in a negative feedback manner the states of the controller, sensed or estimated from the controller state vector $\hat{x}_1(t)$ numbered 207, by providing a resulting controller system matrix vector product $\hat{A}_{11}\hat{x}_1(t)$ at point 224 to an inner controller matrix algebraic summer 210. The negative feedback is closed at point 224 with respect to an error matrix vector product $[\hat{B}_{11}\hat{u}_1(t)-\hat{A}_{12}\hat{x}_2(t)]$ available at point 228. (Again, as in connection with FIGS. 1a and 1b, the terms "negative" and "positive" feedback should be interpreted as two feedbacks opposing each other i.e., of different signs for each element being summed with another corresponding element. This explanation has been given previously in connection with FIG. 1b.). The error matrix vector product $[\hat{B}_{11}\hat{u}_1(t)-\hat{A}_{12}\hat{x}_2(t)]$, available at point 228, is obtained as a result of closing a negative feedback through the elements of the control matrix $\hat{A}$ with respect to a controller input matrix vector product $\hat{B}_{11}\hat{u}_1(t)$, available at point 222. The control matrix $\hat{A}_{12}$ is fed by the states of the output column vector $\hat{x}_2(t)$, sensed or estimated at output denoted with numeral 217, to close the negative feedback in the controller matrix algebraic summer 204 by feeding back a resulting control matrix vector product $\hat{A}_{12}\hat{x}_2(t)$, available at point 223, in a negative feedback manner with respect to the controller input matrix vector product $\hat{B}_{11}\hat{u}_1(t)$, available at point 222. The controller state vector $\hat{x}_1(t)$ is obtained by integrating n controller state variable derivatives $\dot{\hat{x}}_1(t)$, referred to by numeral 205, in integrators 206. The controller state vector $\hat{x}_1(t)$ feeds a process input matrix $\hat{A}$ an a process input matrix vector product $\hat{A}_{21}\hat{x}_1(t)$ is provided at point 226 as an input to a process matrix algebraic summer 216. A disturbance column vector d(t) denoted by numeral 213 also enters the process matrix algebraic summer 216 where it is algebraically summed with the process input matrix vector product $\hat{A}_{21}\hat{x}_1(t)$ and with a process system matrix vector product $\hat{A}_{22}\hat{x}_2(t)$. The process system matrix vector product $\hat{A}_{22}\hat{x}_2(t)$ is provided at point 225 by feeding states of the output column vector $\hat{x}_2(t)$ through a process system matrix $\hat{A}_{22}$ denoted with numeral 218. (It should be understood that this latter action, i.e., providing the process system matrix vector product $\hat{A}HD 22\hat{x}_2(t)$, is an inherent mechanism which models the process under the control. Also belonging to an inherent mechanism within the process modeling is an integration which takes place in integrators denoted with numeral 215. In the same way, on the controller side of FIG. 2, the controller system matrix $\hat{A}$ as well as the integration that takes place in the integrators 206 constitute inherent mechanism which model the controller inherently). A process state variable derivatives $\hat{\dot{x}}_2(t)$, referred to by numeral 214, are produced at the output of the process matrix algebraic summer 216. The output column vector $\hat{x}_2(t)$ is obtained by integrating n process state variable derivatives $\hat{\dot{x}}_2(t)$ in integrators 215. The synthesis procedure described in the previous paragraph consists of sensing or estimating all n states comprising the controller state vector $\hat{x}_1(t)$ and feeding them back through a controller system matrix and differentiation feedback operator 208 whose transfer characteristics are described by $[\hat{A}_{11}+\partial/\partial t]$ and closing a positive feedback loop in the inner controller matrix algebraic summer 210 by providing a controller feedback matrix and state derivatives $[\hat{A}_{11}\hat{x}_1(t)+\hat{\dot{x}}_1(t)]$ at point 227 in a positive feedback manner with respect to the error matrix vector product $[\hat{B}_{11}\hat{u}_1(t)-\hat{A}_{12}\hat{x}_2(t)]$ supplied to point 228.

From FIG. 2

$$\hat{\dot{x}}_1(t)=-\hat{A}_{11}\hat{x}_1(t)-\hat{A}_{12}\hat{x}_2(t)+\hat{B}_{11}u_1(t)+\hat{\dot{x}}_1(t)+\hat{A}_{11}\hat{x}_1(t) \qquad (10)$$

yielding $$\hat{x}_2(t)=\hat{A}_{12}^{-1}\hat{B}_{11}\hat{A}_1(t) \qquad (11)$$

Eq.(11) represents the state-equation description of the zero-order/instantaneous response and infinite disturbance rejection ratio linear control system to which an original n-th order system has been reduced through the controller synthesis method illustrated in FIG. 2. It is seen from Eq.(11) that the input-output relationship fixes the two vectors by a linear algebraic operation rather than by a differential operation, transforming the whole system into the ideal one from the point of response to the inputs, and also the input-output relationship is free from the elements of the controller system matrix $\hat{A}_{11}$, which contain the effects of disturbances, and from the disturbance column vector $\hat{d}(t)$ itself, making the process under the control load/disturbance independent with the associated infinite disturbance rejection ratio. The input-output relationship in Eq.(11) is also independent of the process input and system matrices $\hat{A}_{21}$ and $\hat{A}_{22}$!

Figure 3:
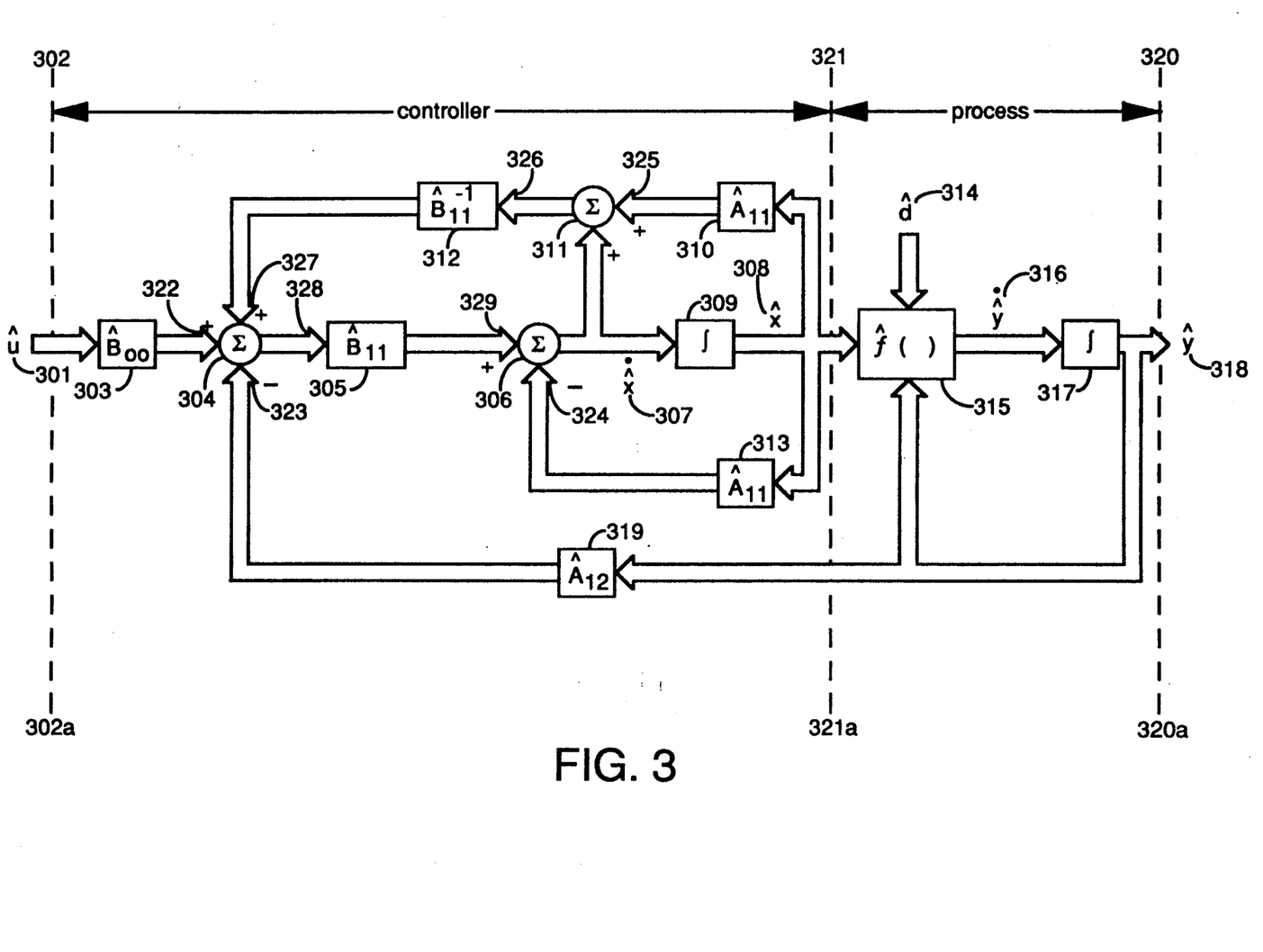
FIG. 3 is a block diagram in a state variable form of another embodiment of invention.

In FIGS. 1a, 1b, and 2, an explicit differentiation of the states of the state vector $\hat{x}(t)$, ($\hat{x}_1(t)$ in FIG. 2), is called for. This requirement may need to involve either an elaborate signal filtering/processing in cases of performing an explicit differentiation or the differentiation can be performed implicitly, for example by using a phase-locked loop with large gain in its forward path, when the state variables, to be differentiated, are not well-behaved, continuously differentiable signals. FIG. 3 shows a differentiation-free synthesis of a controller to provide for the zero-order dynamics and infinite disturbance rejection ratio for the process under the control. The controller is synthesized to cancel the derivative terms in the state-space equations in a differentiation-free manner and, as in connection with FIG. 2, it also cancels the elements of the controller system matrix $\hat{A}_{11}$ thereby providing for the zero-order dynamics and infinite disturbance rejection ratio, in a differentiation-free manner.

In FIG. 3, a control matrix $\hat{A}_{12}$, referred to by numeral 319, represents a desired control operation. The positive controller state feedback loops, containing elements of a controller feedback matrix $\hat{A}_{11}\hat{x}(t)$ added to a controller state variable derivatives $\hat{\dot{x}}(t)$ and passed through the controller input inverse matrix $\hat{B}_{11}^{-1}$, are controlled, i.e., the system stability is ensured, by the negative process state feedback loops closed through the elements of the control matrix $\hat{A}_{12}$. In FIG. 3, the controller portion is shown between boundaries 302-302a and 321-321a while the portion between boundaries 321-321a and 320-320a refers to the process under the control. The process under the control is described by a process dynamic equation $\hat{\dot{y}}(t)=f(\hat{x}(t-),\hat{y}(t),\hat{d}(t)$ and it is represented by a process dynamics $\hat{f}($ ), referred to by numeral 315, and integrators 317. The process dynamics operates on the controller state vector $\hat{x}(t)$, the output column vector $\hat{y}(t)$, and the disturbance column vector $\hat{d}(t)$, and is a function of a process input matrix and process system matrix which are not explicitly shown in FIG. 3 because, as in connection with FIG. 2, the algorithm to be derived in connection with FIG. 3 is independent of these two process matrices. A scaling matrix $\hat{B}_{oo}$, denoted by numeral 303, may generally be employed so that an input column vector $\hat{u}(t)$ denoted by numeral 301 and applied to the scaling matrix $\hat{B}_{oo}$ results into a controller scaling matrix vector product $\hat{B}_{oo}\hat{u}(t)$, available at point 322. In general case, a conventional negative feedback local control matrix is added to the open-loop/inherent controller system matrix and the resulting controller system matrix A11, referred to with numeral 313, feeds in a negative feedback manner the states of the controller, sensed or estimated from the controller state vector $\hat{x}(t)$ numbered 308, by providing a resulting controller system matrix vector product $\hat{A}_{11}\hat{x}(t)$ at point 324 to an inner controller matrix algebraic summer 306 in a negative feedback with respect to a total error matrix vector product $\{\hat{B}_{11}[\hat{B}_{oo}\hat{u}(t)-\hat{A}_{12}\hat{y}(t)+\hat{B}_{11}^{-1}[\hat{A}_{11}\hat{x}(t)+\hat{\dot{x}}(t)]]\}$ available at point 329. (Once more, as in connection with explaining previous figures, the terms "negative" and "positive" feedback are to be interpreted as two feedbacks opposing each other, i.e., of different signs for each element being summed with another corresponding element). The total error matrix vector product available at point 329 is obtained as a result of closing a negative feedback through the elements of the control matrix $\hat{A}_{12}$ with respect to the controller scaling matrix vector product $\hat{B}_{oo}\hat{u}(t)$ and closing a positive feedback through the elements of the controller input inverse matrix $\hat{B}_{11}^{-1}$ with respect to the controller scaling matrix vector product $\hat{B}_{oo}\hat{u}(t)$, in a controller matrix algebraic summer 304 and passing an error matrix vector product, available at point 328, through the controller input matrix $\hat{B}_{11}$, numbered 305. The control matrix $\hat{A}_{12}$ is fed by the states of the output column vector $\hat{y}(t)$, sensed or estimated at output denoted by numeral 318, to close the negative feedback in the controller matrix algebraic summer 304 by feeding back a resulting control matrix vector product $\hat{A}_{12}\hat{y}(t)$, available at point 323, in a negative feedback manner with respect to the controller scaling matrix vector product (t). The controller input inverse matrix $\hat{B}_{11}^{-1}$ is fed by a controller feedback matrix and state derivatives $[\hat{A}_{11}\hat{x}(t)+\hat{\dot{x}}(t)]$, available at point 326, to close the positive feedback in the controller matrix algebraic summer 304 by feeding back a processed controller feedback matrix and state derivatives $[\hat{B}_{11}^{-1}[\hat{A}_{11}\hat{x}(t)+\hat{\dot{x}}(t)]]$, available at point 327, in a positive feedback manner with respect to the controller scaling matrix vector product $\hat{B}_{oo}\hat{u}(t)$. The controller state vector $\hat{x}(t)$, (308), is obtained from n controller state variable derivatives $\hat{\dot{x}}(t)$, available at point 307, by integrating them in integrators 309. The process dynamics, denoted with numeral 315, operates on the controller state vector, available at point 308, the output column vector, available at point 318, and the disturbance column vector, available at point 314, yielding a process state variable derivatives ẏ(t) denoted with numeral 316. The output column vector ŷ(t) is obtained by integrating n process state variable derivatives ẏ(t) in integrators 317. The synthesis procedure described in the previous paragraph consists of sensing or estimating all n states comprising the controller state vector x̂(t) and feeding them back through a controller system matrix feedback operator 310 containing elements of the controller system matrix Â, thus providing a controller feedback matrix $Â_{11}x̂(t)$ at point 325, and sensing or estimating all n controller state variable derivatives ẋ(t) and summing them up with the elements of the controller feedback matrix $Â_{11}x̂(t)$ in a most inner controller matrix algebraic summer 311, thus providing the controller feedback matrix and state derivatives at point 326 as an input to the controller input inverse matrix $B̂_{11}^{-1}$ (312) through which the positive feedback is closed in the controller matrix algebraic summer 304.

From FIG. 3

$$\dot{x̂}(t) = -Â_{11}x̂(t) - B̂_{11}Â_{12}ŷ(t) + B̂_{11}B̂_{oo}$$
$$û(t) + B̂_{11}[B̂_{11}^{-1}\dot{x̂}(t) + B̂_{11}^{-1}Â_{11}x̂(t)] \quad (12)$$

yielding $$ŷ(t) = Â_{12}^{-1}B̂_{oo}û(t) \quad (13)$$

Eq.(13) represents the state-equation description of the zero-order/instantaneous response and infinite disturbance rejection ratio linear control system to which an original n-th order system has been reduced through the differentiation-free controller synthesis method illustrated in FIG. 3. It is see from Eq.(13) that the input-output relationship fixes the two vectors by a linear algebraic operation rather than by a differential operation, transforming the whole system into the ideal one from the point of response to the inputs, and also the input-output relationship is free from the elements of the controller system matrix $Â_{11}$, which contain the effects of disturbances, and from the disturbance column vector itself, making the process under the control load/disturbance independent with the associated infinite disturbance rejection ratio. The input-output relationship in Eq.(13) is also independent of the process dynamics and therefore it is independent of the process input matrix and process system matrix.

Figure 4:
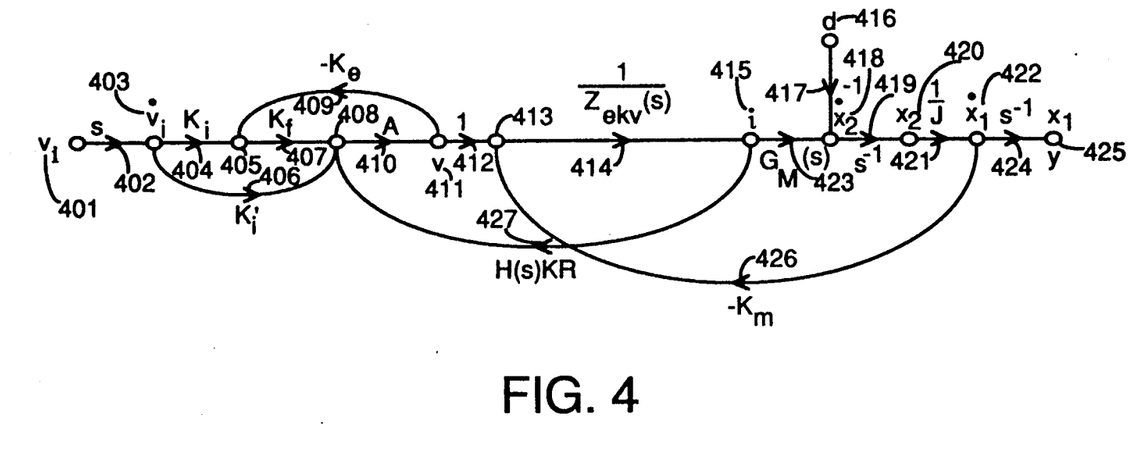
FIG. 4 is a state diagram in a signal flow graph form of the presently preferred embodiment in accordance with the present invention.

It is the purpose of FIG. 4 to present one of a particular applications of the generalized synthesis method described in connection with FIGS. 1a, 1b, and 2. The differentiation-free synthesis method, described in connection with FIG. 3, has been further made a parameter-free synthesis method and, in this evolved form, is presented in application to the synthesis of electric motor drive systems of infinite disturbance rejection ratio and zero-order dynamics/instantaneous response in a copending and coassigned application by N. A. Losic and Lj. Dj. Varga "Parameter-Free Synthesis of Zero-Impedance Converter", Feb. 199 FIG. 4 represents a specific and particular application of the generalized synthesis method developed and shown in FIGS. 1a, 1b, and 2, and it has been previously filed as a copending and coassigned application by N. A. Losic and Lj. Dj. Varga "Synthesis of Improved Zero-Impedance Converter" (mentioned in the background of the invention), Ser. No. 07/457,158, December 1989, in which application the algorithms derived were reached independently from the generalized method provided here, and in a different way. Therefore, the purpose of FIG. 4 is to show the usefulness and applicability of the generalized synthesis method claimed in this application.

In FIG. 4, a gain constant A characterizes transfer function of a pulse width modulated (PWM) control and power stage 410. The PWM power stage is implemented appropriately for the kind of motor which it powers: for example, it may be a dc-to-dc converter for dc motors or a dc-to-ac converter for ac motors or a PWM power stage employed for driving step motors. What is of interest is that the overall voltage gain of the control and power PWM stage 410 is a constant A. Thus, a signal provided at the output of a summing junction 408 is voltage-amplified A times to appear as a state variable in form of a voltage applied to a motor v, denoted with numeral 411, which is unity-transferred, through a unity-gain path denoted 412, to a summing junction 413, with an associated power/current shown as a state variable i at junction 415 and supplied by an input voltage source (not shown). The current state variable i is provided as a result of a resultant voltage, available at the output of the summing junction 413, acting on a motor admittance $1Z_{ekv}(s)$, denoted with numeral 414. The resultant voltage, at the output of the summing junction 413, is a result of a back electromotive force (emf) opposing the voltage applied to the motor, v, and, for an electric motor with constant air-gap flux, this opposition is represented with a back emf constant $K_m$, denoted with numeral 426, so that the back emf is produced in proportion to an output angular shaft speed, represented as a state-variable derivative $ẋ_1$ and referred to by numeral 422. The embodiment of FIG. 4 employs a positive current feedback loop and a negative voltage feedback loop. The positive current feedback loop incorporates a current feedback circuit whose transfer function is H(s). The negative voltage feedback loop incorporates a voltage feedback circuit whose transfer function is a constant $K_e$, referred to by numeral 409. The purpose of the positive current feedback loop is to provide for the synthesis to obtain a load independence, i.e., an infinite disturbance rejection ratio, and to enable further synthesis to obtain a zero-order dynamics/instantaneous response. The purpose of the negative voltage feedback loop is to stabilize the system. The current state variable i is sensed by a current sense device whose transresistance is R and buffered by a differential/buffering amplifier whose gain is K and then processed by the current feedback circuit of transfer function H(s). The collective transfer function in the current feedback loop is thus H(s)KR, denoted with numeral 427, through which the positive current feedback loop is closed in a summing junction 408. The electric motor impedance $Z_{ekv}(s)$ is a series connection of a resistance and an inductive reactance in case of a dc, synchronous ac, and step motors. In case of asynchronous ac motor this impedance consists of a series connection of a stator impedance with a parallel connection of a magnetizing reactance and a rotor impedance referred to stator. The current state variable i is processed by a torque production mechanisms denoted $G_M(s)$ and numbered 423. The motor torque, developed in this way, is opposed by a load torque disturbance d, referred to by numeral 416, and a torque which is a result of this opposition is denoted as a state variable derivative $ẋ_2$ and referred to by numeral 418. The load torque disturbance d is transferred through a unity transfer path 417 to oppose the motor developed torque. The state variable derivative $\dot{x}_2$ is integrated in integrator 419 to produce the state variable x referred to with numeral 420. The state variable $x_2$ is transferred through a path 421 of transfer function 1/J, where J is a system moment of inertia, to produce the state variable derivative $\dot{x}_1$. An angular output shaft position is provided at output 425, and is represented as a state variable $x_1$ equal to the output y, by integrating the state variable derivative $\dot{x}_1$ in integrator 424. The voltage feedback signal is subtracted in a summing junction 405 from a direct path signal $K_i \dot{v}_i$ where $K_i$ is a gain constant in a direct path, referred to by numeral 404, and $\dot{v}_i$ is an input voltage command state variable derivative representing a velocity command and denoted with numeral 403. A voltage error signal is produced at the output of the summing junction 405 and is passed through a forward path, characterized with a gain constant $K_f$ and numbered 407, to be summed with the current feedback signal and a feedforward signal in the summing junction 408. The feedforward signal is provided by passing the input voltage command state variable derivative i.e., the velocity command $\dot{v}_i$, through a feedforward path characterized by a gain constant $K_i'$ and referred to by numeral 406. The velocity command $\dot{v}_i$ is obtained from an input voltage state variable $v_i$ by differentiating it in differentiator 402. The input voltage state variable $v_i$, referred to by numeral 401, represents an angular position command.

The state-space equations that describe the embodiment in FIG. 4 with respect to the load disturbance are $$\left. \begin{array}{l} \dot{\hat{x}}(t) = \hat{A}\hat{x}(t) + \hat{B}\hat{d}(t) \\ \hat{y}(t) = \hat{C}\hat{x}(t) \end{array} \right\} \quad (14)$$

where $$\hat{A} = \begin{bmatrix} 0 & 1/J \\ 0 & -G_m(s)(K_m/J)/\{Z_{ekv}(s) - [H(s)RAK/(1 + AK_eK_f)]\} \end{bmatrix}$$

$$\hat{B} = \begin{bmatrix} 0 \\ -1 \end{bmatrix}$$

$$\hat{C} = [1 \ 0]$$

so that Eq.(14) can be rewritten as $$\dot{x}_1(t) = (1/J)x_2(t) \quad (15)$$

$$\dot{x}_2(t) = \{-G_M(s)(K_m/J)/\{Z_{ekv}(s) - [H(s)RAK/(1+AK_eK_f)]\}\}x_2(t) - d(t) \quad (16)$$

$$y(t) = x_1(t) \quad (17)$$

For infinite disturbance rejection ratio the load independence is called for. This means that the response of the output state variable y(t) to the disturbance d(t) should be zero. Substituting this requirement of y(t)=0 in Eq.(17) yields for the state variable $x_1(t)=0$ so that also $\dot{x}_1(t)=0$. Substituting the last requirement in Eq.(15) yields $x_2(t)=0$. From Eq.(16)

$$\dot{x}_2(t) = [x_2(t)+d(t)]/\{-G_M(s)(K_m/J)/\{Z_{ekv}(s)-[H(s)RAK/(1+AK_eK_f)]\}\} \quad (18)$$

so that the last requirement above, i.e., $x_2(t)=0$, is satisfied, as seen from Eq.(18), for the transfer function of the current feedback circuit in the positive current feedback loop $$H(s) = Z_{ekv}(s)(1+AK_eK_f)/RAK \quad (19)$$

For the algorithm of Eq.(19). the transfer from point 405 to point 422 in FIG. 4 becomes $$\dot{x}_1(t)/K_i \dot{v}_i(t) = AK_f/[K_m(1+AK_eK_f)] \quad (20)$$

The part of the synthesis in FIG. 4 performed thus far yields the infinite disturbance rejection ratio and, as seen from Eq.(20), makes the system independent of the elements of the system matrix $\hat{A}$ which contain the disturbance effects, as predicted by the generalized synthesis method. The algorithm of Eq.(19) also performs a derivative action $\partial/\partial t$ due to the fact that an electric motor equivalent impedance $Z_{ekv}(s)$, as explained earlier, consists of a resistive and inductive components. By performing the differentiation, the algorithm of Eq.(19) also reduces the order of the system in FIG. 4, as predicted by the generalized synthesis method. In general case, the forward path in FIG. 4, denoted with numeral 407, may be characterized by a complex transfer function $G_R'(s)$. In such a case, the algorithm of Eq.(19) reduces the order of the system by providing for the transfer from the input to the output, i.e., from point 401 to point 425, $$y(t)/v_i(t) = [G_R'(s)K_i + K_i']/[G_R'(s)K_mK_e + (K_m/A)] \quad (21)$$

In order not to provide derivatives of more than this one state variable, i.e., the derivative of the current being provided only, and still to bring the system order to zero, a feedforward algorithms are synthesized which, as predicted by the generalized synthesis, along with the algorithm of Eq.(19), will facilitate such a zero-order synthesis. This is shown next.

The state-space equations that describe the embodiment in FIG. 4 with respect to the input command are $$\left. \begin{array}{l} \dot{\hat{x}}(t) = \hat{A}\hat{x}(t) + \hat{B}_i \hat{v}_i(t) \\ \hat{y}(t) = \hat{C}\hat{x}(t) \end{array} \right\} \quad (22)$$

where $$\hat{B}_i = \begin{bmatrix} 0 \\ G_m(s)[As(K_i' + K_iK_f)]/\{Z_{ekv}(s)(1 + AK_eK_f) - H(s)RAK\} \end{bmatrix}$$

while the matrices $\hat{A}$ and $\hat{C}$ are as those in Eq.(14) so that Eq.(22) can be rewritten as those in Eqs.(15) and (17) while Eq.(16) becomes $$\dot{x}_2(t) = \{-G_M(s)(K_m/J)/\{Z_{ekv}(s)-[H(s)RAK/(1+AK_eK_f)]\}\}x_2(t) + \{G_M(s)[As(K_i'+K_iK_f)]/\{Z_{ekv}(s)(1+AK_eK_f) - H(s)RAK\}\}v_i(t) \quad (23)$$

For zero-order dynamics the input-output relationship should be related through a constant, i.e., y(t) =

$mv_r(t)$. We will arrive at such the relationship as follows. The state variable $x_2(t)$ from Eq.(23) is $$x_2(t)=\{[[Z_{ekv}(s)(1+AK_eK_f)-H(s)RAK]\dot{x}_2(t)]-G_M(-s)]As(K_i'+K_iK_f)v_r(t)/\{-G_M(s)(K_m/J)(1+AK_eK_f)\} \quad (24)$$

As discussed in connection with the algorithm for the infinite disturbance rejection ratio, given by Eq.(19), it also performs a differentiation, due to the inductive part(s) in a motor equivalent impedance $Z_{ekv}(s)$, and thus it contributes towards reducing the order of the system as well. Thus, we shall reduce the order of the embodiment in FIG. 4 by substituting the algorithm of Eq.(19) in Eq.(24) to obtain $$x_2(t)=[As(K_i'+K_iK_f)]v_r(t)/[K_m/J)(1+AK_eK_f)] \quad (25)$$

From Eq.(15) the Laplace transform yields $X_2(s)=JsX_1(s)$ and from Eq.(17) the Laplace transform gives $X_1(s)=Y(s)$ so that, upon Laplace transforming state variables in Eq.(25) and partially performing the inverse transform and characterizing the forward path 407 by a generalized complex transfer function $G_R'(s)$ rather than by the constant gain constant $K_f$, the input-output relationship is as originally stated in Eq.(21), without deriving it at that time, and repeated here $$y(t)/v_r(t)=[G_R'(s)K_i+K_i']/[G_R'(s)K_mK_e+(K_m/A)]$$

The zero-order dynamics is achieved, as seen from Eq.(21), and the system transfer function is made constant m by synthesizing gain constants in direct path 404 and feedforward path 406 as $$K_i mK_mK_e \quad (26)$$

$$K_i'=mK_m/A \quad (27)$$

Therefore, for the algorithms given in Eqs.(19), (26), and (27), the input-output relationship for the embodiment of FIG. 4 becomes $$y(t)/v_r(t)=m \quad (28)$$

Denoting a part of the output angular shaft position response due the input position command in Eq.(28) $y_i(t)=mv_r(t)$, and a part of the output angular shaft position response due to the load torque disturbance $y_d(t)$, the disturbance rejection ratio of the embodiment in FIG. 4 is defined as $$d_{rr}(t)=y_i(t)/y_d(t) \quad (29)$$

Since the algorithm of Eq.(19) provides load independence of the output angular shaft position, i.e., $y_d(t)=0$, the disturbance rejection ratio is infinite $$d_{rr}(t)=\infty \quad (30)$$

Therefore, both properties of zero-order/instantaneous response and of infinite disturbance rejection ratio, as given in Eqs.(28) and (30), respectively, have been achieved by applying the generalized synthesis method, developed and shown in FIGS. 1a, 1b, and 2, to the specific system of FIG. 4, and in a particular way described in connection with FIG. 4. The particular application of the generalized synthesis method to the system of FIG. 4 made use of the feedforward algorithms and of differentiation present in the algorithm for load independence, so that only one state variable, motor current i, had to be sensed to be differentiated. The possibility for this was discussed and predicted by the generalized synthesis method.

The preceding paragraph is also to say that various particular applications of the generalized synthesis method presented here may be made, within the scope of the inventive concept, without departing from it.

We claim:

1. A method for synthesizing control systems of zero order and infinite disturbance rejection ratio comprising:

controlling an output column vector of a process under the control, supplying an input column vector to a controller, passing said input column vector through a controller input matrix; thereby producing a controller input matrix vector product, supplying a resulting control matrix vector product from said output column vector, sensing or estimating states of said output column vector and passing them through a control matrix; thereby producing said resulting control matrix vector product, feeding back said resulting control matrix vector product in a negative feedback loop with respect to said controller input matrix vector product; thereby producing an error matrix vector product, supplying a resulting controller system matrix vector product from a controller state vector, sensing or estimating states of said controller state vector and passing them through a resulting controller system matrix; thereby producing said resulting controller system matrix vector product, feeding back said resulting controller system matrix vector product in a negative feedback loop with respect to said error matrix vector product supplying a controller feedback matrix and state derivatives from said controller state vector, passing the sensed or the estimated states of said controller state vector through a controller system matrix and differentiation feedback operator; thereby producing said controller feedback matrix and state derivatives, feeding back said controller feedback matrix and state derivatives in a positive feedback loop with respect to said error matrix vector product, summing algebraically said error matrix vector product with said resulting controller system matrix vector product and with said controller feedback matrix and state derivatives in an inner controller matrix algebraic summer, passing a result of the summation in said inner controller matrix algebraic summer through an inherent integration in said controller; thereby obtaining the states of said controller state vector, supplying the states of said controller state vector, obtained passing said result of the summation in said inner controller matrix algebraic summer through said inherent integration in said controller, for controlling said output column vector of said process under the control, whereby said process under the control is being made of zero order dynamics and infinite disturbance rejection ratio.

2. The method of claim 1 wherein said controller system matrix and differentiation feedback operator is synthesized providing a transfer characteristics of said controller system matrix and differentiation feedback operator $$\hat{A}_{11} + \partial/\partial t$$

in said transfer characteristics $\hat{A}HD\ 11$ being said resulting controller system matrix, and $\partial/\partial t$ being differentiation operator.

3. The method of claim 1 wherein said result of the summation in said inner controller matrix algebraic summer is obtained providing a state space equation of said controller controlling said process under the control $$\dot{\hat{x}}_1(t) = -\hat{A}_{11}\hat{x}_1(t) - \hat{A}_{12}\hat{x}_2(t) + \hat{B}_{11}\hat{u}_1(t) + \dot{\hat{x}}_1(t) + \hat{A}_{11}\hat{x}_1(t)$$

in said state space equation $\dot{\hat{x}}_1/(t)$ being a controller state variable derivatives, $\hat{x}_1(t)$ being said controller state vector, $\hat{x}_2(t)$ being said output column vector, $\hat{u}_1(t)$ being said input column vector, $\hat{A}_{11}$ being said resulting controller system matrix $\hat{A}_{12}$ being said control matrix, and $\hat{B}_{11}$ being said controller input matrix.

4. The method of claim 2 wherein said transfer characteristics of said controller system matrix and differentiation feedback operator is physically implemented, thereby implementing said controller system matrix and differentiation feedback operator, in accordance with a value of said resulting controller system matrix $\hat{A}_{11}$ and in accordance with the differentiation operator $\partial/\partial t$.

5. The method of claim 3 wherein said state space equation of said controller controlling said process under the control is physically implemented, thereby implementing said controller, as a positive feedback closed through the controller system matrix and differentiation operator cancelling elements of said resulting controller system matrix $\hat{A}_{11}$ through which a negative feedback is closed and cancelling said controller state variable derivatives $\hat{x}_1(t)$, whereby said positive feedback closed through the controller system matrix and differentiation operator is being closed within an outer negative feedback closed through said control matrix $\hat{A}_{12}$ with respect to a controller input matrix vector product $\hat{B}_{11}\hat{u}_1(t)$.

6. A method for synthesizing control systems of zero order and infinite disturbance rejection ratio comprising:

controlling an output column vector of a process under the control, supplying an input column vector to a controller, passing said input column vector through a scaling matrix; thereby producing a controller scaling matrix vector product, supplying a resulting control matrix vector product from said output column vector, sensing or estimating states of said output column vector and passing them through a control matrix; thereby producing said resulting control matrix vector product, feeding back said resulting control matrix vector product in a negative feedback loop with respect to said controller scaling matrix vector product and summing algebraically the two products in a controller matrix algebraic summer, feeding back a processed controller feedback matrix and state derivative in a positive feedback loop with respect to said controller scaling matrix vector product, summing algebraically said processed controller feedback matrix and state derivatives with the algebraic sum of said controller scaling matrix vector product and said resulting control matrix vector product in said controller matrix algebraic summer; thereby producing an error matrix vector product, passing said error matrix vector product through a controller input matrix; thereby producing a total error matrix vector product, supplying a resulting controller system matrix vector product from a controller state vector, sensing or estimating states of said controller state vector and passing them through a resulting controller system matrix; thereby producing said resulting controller system matrix vector product, feeding back said resulting controller system matrix vector product in a negative feedback loop with respect to said total error matrix vector product, supplying a controller feedback matrix from said controller state vector, passing the sensed or the estimated states of said controller state vector through a controller system matrix feedback operator; thereby producing said controller feedback matrix, sensing or estimating a controller state variable derivatives, obtained as an output from an inner controller matrix algebraic summer, and summing them up with the elements of said controller feedback matrix in a most inner controller matrix algebraic summer; thereby producing a controller feedback matrix and state derivatives, passing said controller feedback matrix and state derivatives through a controller input inverse matrix; thereby producing said processed controller feedback matrix and state derivatives, summing algebraically said total error matrix vector product with said resulting controller system matrix vector product in said inner controller matrix algebraic summer, passing said output from said inner controller matrix algebraic summer through an inherent integration in said controller; thereby obtaining the states of said controller state vector, supplying the states of said controller state vector, obtained passing said output from said inner controller matrix algebraic summer through said inherent integration in said controller, for controlling said output column vector of said process under the control, whereby said process under the control is being made of zero order dynamics and infinite disturbance rejection ratio in the differentiation free manner.

7. The method of claim 6 wherein said controller system matrix feedback operator is synthesized providing a transfer characteristics of said controller system matrix feedback operator $$\hat{A}_{11}$$

in said transfer characteristics A being said resulting controller system matrix.

8. The method of claim 6 wherein said output from said inner controller matrix algebraic summer is obtained providing a state space equation of said controller controlling said process under the control $$\dot{\hat{x}}(t) = -\hat{A}_{11}\hat{x}(t) - \hat{B}_{11}\hat{A}_{12}$$
$$\hat{y}(t) + \hat{B}_{11}\hat{B}_{oo}\hat{u}(t) + \hat{B}_{11}[\hat{B}_{11}^{-1}\dot{\hat{x}}(t) + \hat{B}_{11}^{-1}\hat{A}_{11}\hat{x}(t)]$$

in said state space equation $\dot{\hat{x}}(t)$ being said controller state variable derivatives, $\hat{x}(t)$ being said controller state vector, $\hat{y}(t)$ being said output column vector, $\hat{u}(t)$ being said input column vector, $\hat{A}_{11}$ being said resulting controller system matrix, $\hat{A}_{12}$ being said control matrix, $\hat{B}_{11}$ being said controller input matrix, $\hat{B}_{11}^{-1}$ being said controller input inverse matrix, and $\hat{B}_{\infty}$ being said scaling matrix.

9. The method of claim 7 wherein said transfer characteristics of said controller system matrix feedback operator is physically implemented, thereby implementing said controller system matrix feedback operator, in accordance with a value of said resulting controller system matrix $\hat{A}_{11}$ 10. The method of claim 8 wherein said state space equation of said controller controlling said process under the control is physically implemented, thereby implementing said controller, as a positive feedback closed through said controller system matrix feedback operator of transfer $\hat{A}_{11}$ and through said controller input inverse matrix $\hat{B}_{11}^{-1}$, the two matrices being in a series connection, and closing the positive feedback loop through said controller input matrix $\hat{B}_{11}$ cancelling elements of said resulting controller system matrix $\hat{A}_{11}$ through which a negative feedback is closed and cancelling said controller state variable derivatives $\dot{\hat{x}}(t)$ by feeding the sensed or the estimated controller state variable derivatives in the positive feedbAck loop closed through said controller input inverse matrix $\hat{B}_{11}^{-1}$ in series with said controller input matrix $\hat{B}_{11}$, whereby the positive feedback loops are being closed within an outer negative feedback closed through said control matrix $\hat{A}_{12}$ with respect to a controller scaling matrix vector product $\hat{B}_{\infty}\hat{u}(t)$.

* * * * *